United States Patent
Kirsch

(10) Patent No.: US 9,244,750 B2
(45) Date of Patent: Jan. 26, 2016

(54) METHOD AND CONTROL SYSTEM FOR CARRYING OUT A PLAUSIBILITY CHECK OF A FIRST DRIVER INPUT SENSOR WITH REGARD TO A SECOND DRIVER INPUT SENSOR WHICH IS DIFFERENT FROM THE FIRST DRIVER INPUT SENSOR OF A MOTOR VEHICLE

(71) Applicant: Andreas Kirsch, Stuttgart (DE)

(72) Inventor: Andreas Kirsch, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 70 days.

(21) Appl. No.: 13/767,529

(22) Filed: Feb. 14, 2013

(65) Prior Publication Data

US 2013/0211661 A1    Aug. 15, 2013

(30) Foreign Application Priority Data

Feb. 15, 2012   (DE) .......................... 10 2012 202 294

(51) Int. Cl.
| | | |
|---|---|---|
| *G01M 17/00* | (2006.01) |
| *G06F 11/00* | (2006.01) |
| *B60W 50/02* | (2012.01) |
| *B60W 50/023* | (2012.01) |

(52) U.S. Cl.
CPC ......... *G06F 11/008* (2013.01); *B60W 50/0205* (2013.01); *B60W 50/023* (2013.01); *B60W 2050/021* (2013.01)

(58) Field of Classification Search
USPC .............................................. 701/30.3, 70, 48
See application file for complete search history.

(56) References Cited

U.S. PATENT DOCUMENTS

| | | | |
|---|---|---|---|
| 2011/0295468 A1* | 12/2011 | Crombez et al. ................. | 701/48 |
| 2012/0095657 A1* | 4/2012 | Pudvay ........................... | 701/53 |
| 2013/0238216 A1* | 9/2013 | Yamamoto et al. ........... | 701/101 |
| 2014/0038774 A1* | 2/2014 | Kida et al. ...................... | 477/96 |
| 2014/0095045 A1* | 4/2014 | Takagi et al. ................... | 701/70 |

* cited by examiner

*Primary Examiner* — Hussein A. Elchanti
(74) *Attorney, Agent, or Firm* — Kenyon & Kenyon LLP

(57) ABSTRACT

A method for carrying out a plausibility check of a first driver input sensor with regard to a second driver input sensor which is different from the first driver input sensor of a motor vehicle includes the first and the second driver input sensors each monitoring interventions of a driver in a brake pedal or an accelerator pedal, or a steering wheel, or a selector lever of the motor vehicle, the measuring signals of the first and the second driver input sensors being detected and redundantly evaluated independently of one another in a first functional module and a second functional module which is independent of the first functional module, and the two evaluations being compared to one another.

13 Claims, 1 Drawing Sheet

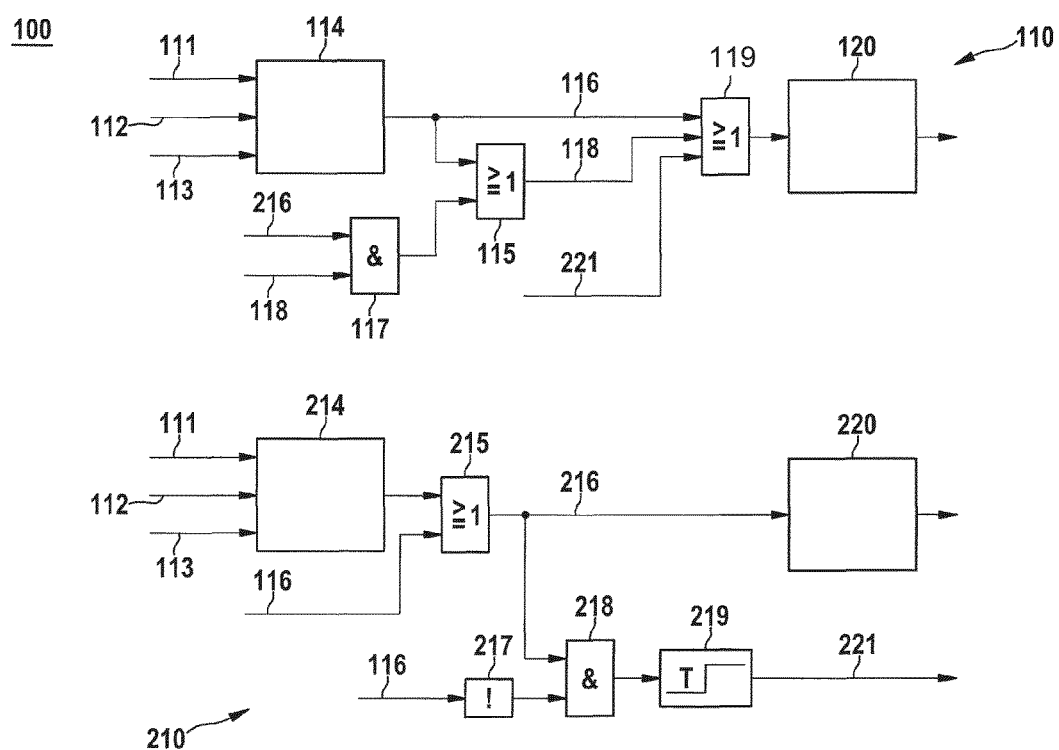

METHOD AND CONTROL SYSTEM FOR CARRYING OUT A PLAUSIBILITY CHECK OF A FIRST DRIVER INPUT SENSOR WITH REGARD TO A SECOND DRIVER INPUT SENSOR WHICH IS DIFFERENT FROM THE FIRST DRIVER INPUT SENSOR OF A MOTOR VEHICLE

CROSS REFERENCE TO RELATED APPLICATION

The present application claims priority to Application No. DE 10 2012 202 294.5, filed in the Federal Republic of Germany on Feb. 15, 2012, which is expressly incorporated herein in its entirety by reference thereto.

FIELD OF INVENTION

The present invention relates to a method and a corresponding control system for carrying out a plausibility check of a first driver input sensor with regard to a second driver input sensor which is different from the first driver input sensor of a motor vehicle.

BACKGROUND INFORMATION

In general, a plausibility check is a method within whose scope a value or a result, in general, is checked for whether it is plausible at all, i.e., whether it may be acceptable, evident, and comprehensible. For this purpose, a present obvious inaccuracy, in particular, is to be detected to be able to initiate appropriate countermeasures.

Plausibility checks in the automotive field usually relate to monitoring specific signals of various functional units within the motor vehicle. Such plausibility checks are, in particular, necessary in the case of specific driver input sensors, such as a plausibility check of the two driver input sensors "accelerator pedal" and "brake." For example, the simultaneous operation of these two pedals may result in a lack of plausibility since an operation of the accelerator pedal and an operation of the brake usually counteract one another and it is thus not possible that they correspond to the driver input and/or to a particular driving situation at the same time. During a plausibility check, other boundary conditions are usually also taken into account to be able to assess the most likely instantaneous driver input in order to thus reverse or cancel an instantaneous accelerator pedal value in favor of a brake request, for example.

A safety function "accelerator pedal brake plausibility check" (ABP) which carries out a plausibility check of the two driver input sensors "accelerator pedal" and "brake" in an engine control unit is known from the related art. In this case, the safety function ABP is only carried out in a so-called "user software" architecture plane (plane 1) and is thus not subject to additional control-unit internal safety measures which are customary for control unit monitoring functions, for example. In the corresponding software architecture of the motor vehicle, there is usually another plane, referred to in the following as plane 2, in which a functional monitoring software is stored and which is configured to be able to check control units even with regard to their calculations and to thus implement a double check, so to speak.

Against the background of the related art, it was now an object of the present invention to provide a plausibility check of a first driver input sensor with regard to a second driver input sensor, in addition to a previously known calculation in a user software (plane 1), from now on also in a functional monitoring software (plane 2) in order to thus be able to eliminate a possible control-unit internal erroneous plausibility check.

SUMMARY

To achieve this object, the present invention proposes a method as well as a control system.

According to the present invention, a method is provided for carrying out a plausibility check of a first driver input sensor with regard to a second driver input sensor which is different from the first driver input sensor of a motor vehicle in which the first and the second driver input sensors each monitors interventions of a driver in a brake pedal or an accelerator pedal, or a steering wheel, or a selector lever of the motor vehicle. According to the method according to the present invention, measuring signals of the first and the second driver input sensors are detected and are redundantly evaluated independently of one another in a first functional module and a second functional module which is independent of the first functional module. The two evaluations are then compared to one another.

By additionally redundantly evaluating or checking the plausibility of two different driver input sensors, such as the driver input sensor "accelerator pedal" and the driver input sensor "brake" in a second functional unit, which is independent of the first functional unit, a truly reliable plausibility check in an engine control unit may be ensured between the first driver input sensor, e.g., "accelerator pedal," and the second driver input sensor, e.g., "brake."

According to one exemplary embodiment of the method according to the present invention, the first functional module is provided in a user software (plane 1) of a control software architecture of a corresponding motor vehicle, while the second functional module is to be provided in a functional monitoring software (plane 2) of the control software architecture of the corresponding motor vehicle.

According to another exemplary embodiment of the method according to the present invention, additional boundary conditions which are relevant to the plausibility check are taken into account when evaluating the measuring signals of the first and the second driver input sensors.

Additional boundary conditions for the plausibility check are, for example, the status values of the driver input sensors, in particular those which indicate whether the driver input sensor has already been classified as defective or as having limited availability. Moreover, system variables such as vehicle speed and motor speed are used for the plausibility check.

According to one exemplary embodiment of the method according to the present invention, the first driver input sensor monitors interventions of the driver in the brake pedal and the second driver input sensor monitors interventions of the driver in the accelerator pedal. Based on this specific exemplary embodiment, the further method is to be explained in the following in greater detail with reference to the accompanying drawing. In this case, the first driver input sensor is referred to as "brake pedal" and the second driver input sensor is referred to as "accelerator pedal."

According to one exemplary embodiment of the method according to the present invention, a detected lack of plausibility between the accelerator pedal and the brake pedal in both evaluations results in a reduction of a corresponding accelerator pedal value. According to the present invention, such a reduction of the accelerator pedal value in the case of a detected lack of plausibility with regard to the brake is now not only taken into account for a driver input calculation of the user software (plane 1), as used to be the case previously, but also, from now on, in the functional monitoring software. Therefore, there are no more inaccuracies or widenings of the functional monitoring software in the case of lack of plausibility. The safety concept of the two named software planes is based on the accelerator pedal values of the two planes, plane 1 and plane 2, being compared at a different point. The functional monitoring software (plane 2) represents a limitation of the user software (plane 1). Previously, plane 2 has not carried out any reduction of the accelerator pedal value and has thus used a higher accelerator pedal value than plane 1 when there was a lack of plausibility. As a result, plane 2 was not able to achieve a limitation of plane 1 in the case of other errors either and was thus too high or "widened" with regard to its comparison or limitation value.

In another exemplary embodiment of the method according to the present invention, the comparison of the evaluation is implemented with the aid of a logical OR link between the first functional module and the second functional module.

According to another exemplary embodiment of the method according to the present invention, in the case of the first functional module not detecting a lack of plausibility, the second functional module directs a response request to the first functional module with regard to the lack of plausibility, after a chronological debouncing including a repeated check of the two evaluations. In general, debouncing is understood as the following procedure: After the occurrence of an error, a so-called debounce counter is initially started and, if the error does not disappear before the debounce time elapses, an entry is made into an error memory and, if necessary, the second functional module appropriately intervenes in the first functional module's ability to respond, as provided according to the present invention.

According to yet another exemplary embodiment of the method according to the present invention, a detected lack of plausibility is eliminated and the evaluation is thus reset in the first functional module only after the second functional module confirms the elimination of the detected plausibility to be carried out and the detected lack of plausibility is eliminated, and after the evaluation was reset accordingly in the second functional module.

Here, the elimination of the detected lack of plausibility in the first functional module takes place immediately after the elimination of the detected lack of plausibility in the second functional module.

The present invention furthermore relates to a control system for carrying out a plausibility check of a first driver input sensor with regard to a second driver input sensor which is different from the first driver input sensor of a motor vehicle.

The first and the second driver input sensors each monitors interventions of a driver in a brake pedal or an accelerator pedal, or a steering wheel, or a selector lever of the motor vehicle. The control system according to the present invention includes a reception and memory unit which is configured to detect measuring signals of the first and the second driver input sensors. Furthermore, the control system includes a first and a second functional module which are in communication with the reception unit, the first functional module and the second functional module, which is independent of the first functional module, being configured to evaluate the measuring signals redundantly and independently of one another and comparing the two evaluations to one another.

The control system according to the present invention is, in particular, configured to carry out an above-described method according to the present invention.

Further advantages and exemplary embodiments of the present invention are described below with reference to the accompanying drawing.

It is understood that the above-named features and the features to be elucidated below are usable not only in the particular given combination, but also in other combinations or alone, without departing from the scope of the present invention.

BRIEF DESCRIPTION OF THE DRAWING

FIG. 1 schematically shows an architecture of a possible exemplary embodiment of a control system according to the present invention.

DETAILED DESCRIPTION

The present invention is illustrated schematically on the basis of exemplary embodiments in the drawing and is described in greater detail in the following with reference to the accompanying drawing.

FIG. 1 schematically shows an exemplary embodiment of a control system 100 according to the present invention. Control system 100 has a first functional module 110 and a second functional module 210 which is independent of the first functional module. Functional module 110 and functional module 210 have access to or receive measuring signals of a first and a second driver input sensor from a reception and memory unit (not shown here). In the case illustrated here, the first driver input sensor is a "brake" or a "brake pedal" and the second driver input sensor is an "accelerator pedal."

Furthermore, first functional module 110 and second functional module 210 have access to other data or boundary conditions which are relevant to a plausibility check to be carried-out. A measuring signal "accelerator pedal position" of the second driver input sensor is incorporated into the two calculations or evaluations of functional module 110 and functional module 210 using value 111. Furthermore, measuring signal "brake status" 112 is taken into account by functional module 110 and functional module 210 for the particular evaluation. Other conditions 113 are also incorporated into a particular evaluation of first functional module 110 and second functional module 210.

In first functional module 110, an accelerator pedal brake plausibility check (ABP) 114 is then carried out on the basis of this information 111, 112, 113. Independently thereof, an accelerator pedal brake plausibility check (ABP) 214 is also carried out in second functional module 210. A detected lack of plausibility between the accelerator pedal and the brake results, in both first functional module 110 and second functional module 210, in a reduction of the accelerator pedal value, as indicated in evaluation 120 and 220. For the evaluation by second functional module 210 to always also be activated immediately after the detection of the evaluation by first functional module 110, a logical OR link 215 is provided in second functional module 210. This is where plausibility check 214 by the second functional module as well as evaluation 116 by the first functional module are received; this results in a comparison 216 in the second functional module followed by an appropriate reduction of accelerator pedal value 220. In this way, an activation of the evaluation of the ABP may be kept synchronous in the two functional modules 110 and 210.

If in first functional module 110 a present lack of plausibility between the accelerator pedal and the brake is not detected, e.g., due to control-unit internal errors, the detection of this present lack of plausibility takes place in second functional module 210. This is where a request for reducing the accelerator pedal value is then directed to functional module 110 with a check of the two evaluations 214 and 116, or comparison 216 and evaluation 116, after a chronological debouncing 219, thus forcing functional module 110 to respond accordingly. To enable this, the evaluation or accelerator pedal brake plausibility check 116 by first functional module 110 is initially conveyed in second functional module 210 to a logical "non" calculation 217 and is then combined with evaluation ABP 216 of second functional module 210 using a logical "AND" link 218, and subjected to a chronological debouncing 219 so that the resulting request for reducing accelerator pedal value 221 is forwarded to first functional module 110.

ABP request 221 of second functional module 210 is then conveyed to a logical OR link 119 and ultimately also results in a reduction of accelerator pedal value 120 in first functional module 110.

An elimination of a lack of plausibility and thus a reset of the ABP evaluation may only take place if first functional module 110 and second functional module 210 detect that the accelerator pedal and the brake behave plausibly again. For this purpose, a holding condition is created in first functional module 110 with the aid of an assistance status 118, which is activated by ABP evaluation 116 of the first functional module and may only be dismissed if ABP evaluation 216 of second functional module 210 is no longer activated, i.e., the lack of plausibility is no longer valid. For this purpose, evaluation 216 and assistance status 118 are combined via a logical AND link 117 and are subsequently compared to evaluation ABP 116 via a logical OR link 115, so that assistance status 118 is ultimately reset if evaluation 216 and evaluation 116 coincide. In this way, first functional module 110 waits for second functional module 210 to confirm the detected lack of plausibility before the first functional module eliminates this lack of plausibility. This means that the reduction of the accelerator pedal value is eliminated again first in second functional module 210 and immediately afterward in first functional module 110. In this way, the accelerator pedal value of first functional module 110 is not greater than the value of evaluation ABP 216 of second functional module 210 even if evaluation ABP 116 is reset.

What is claimed is:

1. A computer implemented method for carrying out a reliable plausibility check of sensors of a motor vehicle, the method comprising:
   monitoring, by each of the first driver input sensor and the second driver input sensor, interventions of a driver in one of a brake pedal, an accelerator pedal, a steering wheel, or a selector lever of the motor vehicle, the second driver input sensor being different than the first driver input sensor;
   detecting, by a computer processor, a measuring signal of each of the first driver input sensor and the second driver input sensor;
   redundantly evaluating for plausibility, by the computer processor, both the measuring signal of the first driver input sensor and the measuring signal of the second driver input sensor in each of a first functional module and a second functional module, the second functional module being independent of the first functional module; and
   comparing, by the computer processor, a plausibility evaluation of the first functional module to a plausibility evaluation of the second functional module; and
   responsive to the comparison of the plausibility evaluation of the first functional module and the plausibility evaluation of the second functional module indicating a lack of plausibility, adjusting one of the detected measuring signals.

2. The method according to claim 1, wherein additional boundary conditions which are relevant to the plausibility check are taken into account when evaluating the measuring signal of the first driver input sensor and the measuring signal of the second driver input sensor.

3. The method according to claim 1, wherein the first driver input sensor monitors interventions of the driver in the brake pedal and the second driver input sensor monitors interventions of the driver in the accelerator pedal.

4. The method according to claim 3, further comprising:
   reducing a corresponding accelerator pedal value based on a detected lack of plausibility between the accelerator pedal and the brake pedal in the two evaluations.

5. The method according to claim 1, wherein the comparing of the two evaluations is implemented with aid of a logical OR link between the first functional module and the second functional module.

6. The method according to claim 1, further comprising:
   in a case of the first functional module not detecting a lack of plausibility, directing by the second functional module a response request to the first functional module with regard to the lack of plausibility after a chronological debouncing, including a repeated check of the two evaluations.

7. The method according to claim 1, further comprising:
   eliminating a detected lack of plausibility and thus resetting the evaluation of the first functional module only after the second functional module confirms and eliminates the detected lack of plausibility, and after the evaluation of the second functional module is reset.

8. The method according to claim 7, wherein the elimination of the detected lack of plausibility in the first functional module takes place instantaneously after the elimination of the detected lack of plausibility in the second functional module.

9. The method according to claim 1, wherein system variables which are relevant to the plausibility check are taken into account when evaluating the measuring signal of the first driver input sensor and the measuring signal of the second driver input sensor, the system variable including at least one of a vehicle speed and a motor speed.

10. The method according to claim 3, wherein the measuring signal of the first input driver sensor is a brake status, and wherein the measuring signal of the second input driver sensor is an accelerator pedal position.

11. The method according to claim 1, wherein the redundant evaluation for plausibility is in part performed by an accelerator pedal brake plausibility check in the first functional module and an accelerator pedal brake plausibility check in the second functional module.

12. The method according to claim 7, wherein an assistance status is generated as a result of the detected lack of plausibility, the assistance status creating a holding condition that may only be dismissed if the detected lack of plausibility is no longer valid.

13. A control system for carrying out a reliable plausibility check of sensors of a motor vehicle, the control system comprising:
   the first driver input sensor and the second driver input sensor each configured to monitor interventions of a driver in one of a brake pedal, an accelerator pedal, a steering wheel, or a selector lever of the motor vehicle, the second driver input sensor being different than the first driver input sensor; and a reception and memory unit configured to detect a measuring signal of each of the first driver input sensor and the second driver input sensor, a first functional module and a second functional module being in communication with the reception unit;

wherein the first functional module and the second functional module, which is independent of the first functional module, are configured to redundantly evaluate for plausibility both the measuring signal of the first driver input sensor and the measuring signal of the second driver input sensor in each of a first functional module and a second functional module,—and wherein the first functional module and the second functional module are configured to compare a plausibility evaluation of the first functional module to a plausibility evaluation of the second functional module; and responsive to the comparison of the plausibility evaluation of the first functional module and the plausibility evaluation of the second functional module indicating a lack of plausibility, adjusting one of the detected measuring signals.

* * * * *